April 25, 1950 R. G. RAMSEY ET AL 2,505,302
APPARATUS FOR WOOD TREATMENT
Filed Oct. 26, 1945 4 Sheets-Sheet 1
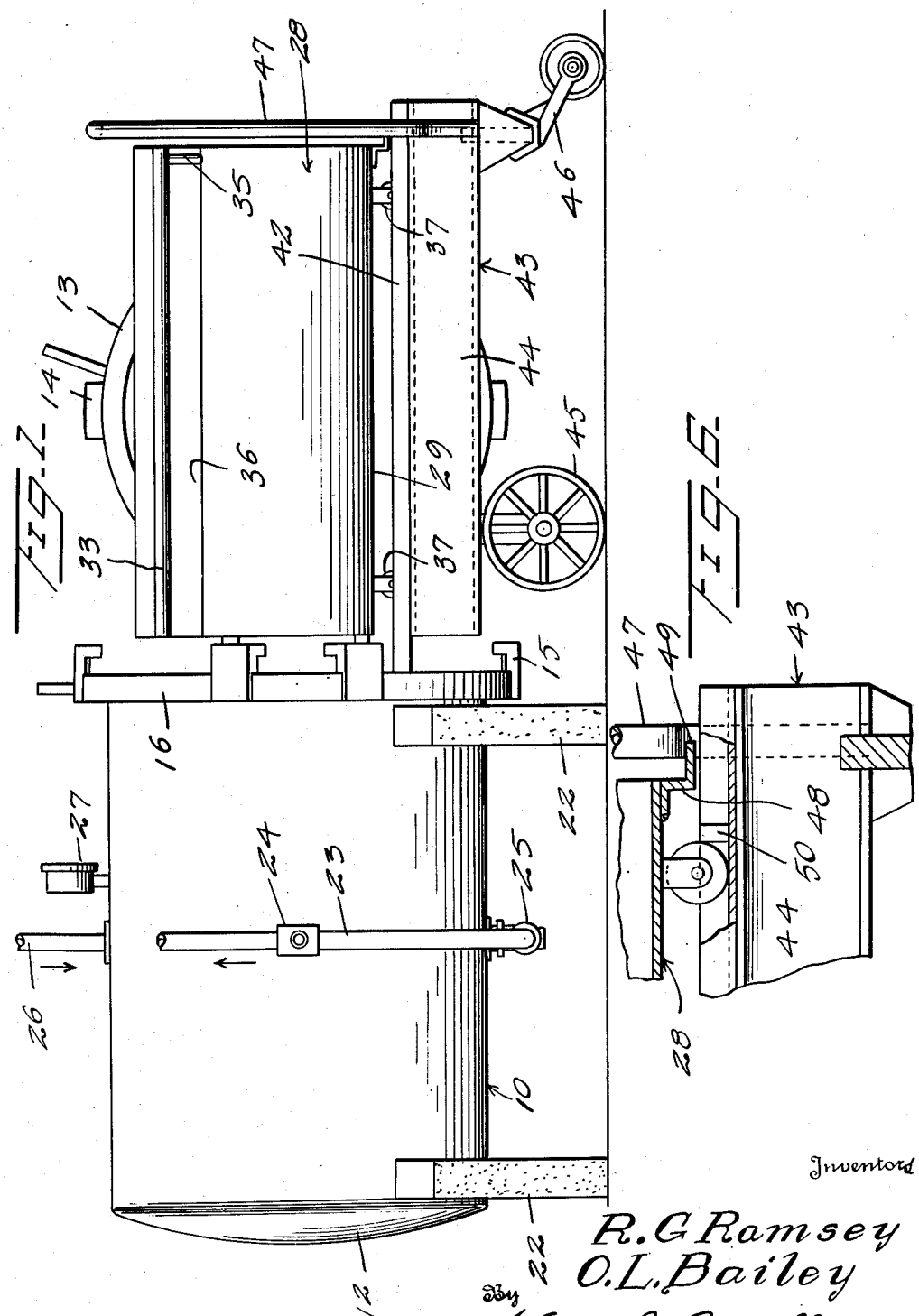
Inventors
R. G. Ramsey
O. L. Bailey
By Kimmel & Crowell Attorneys

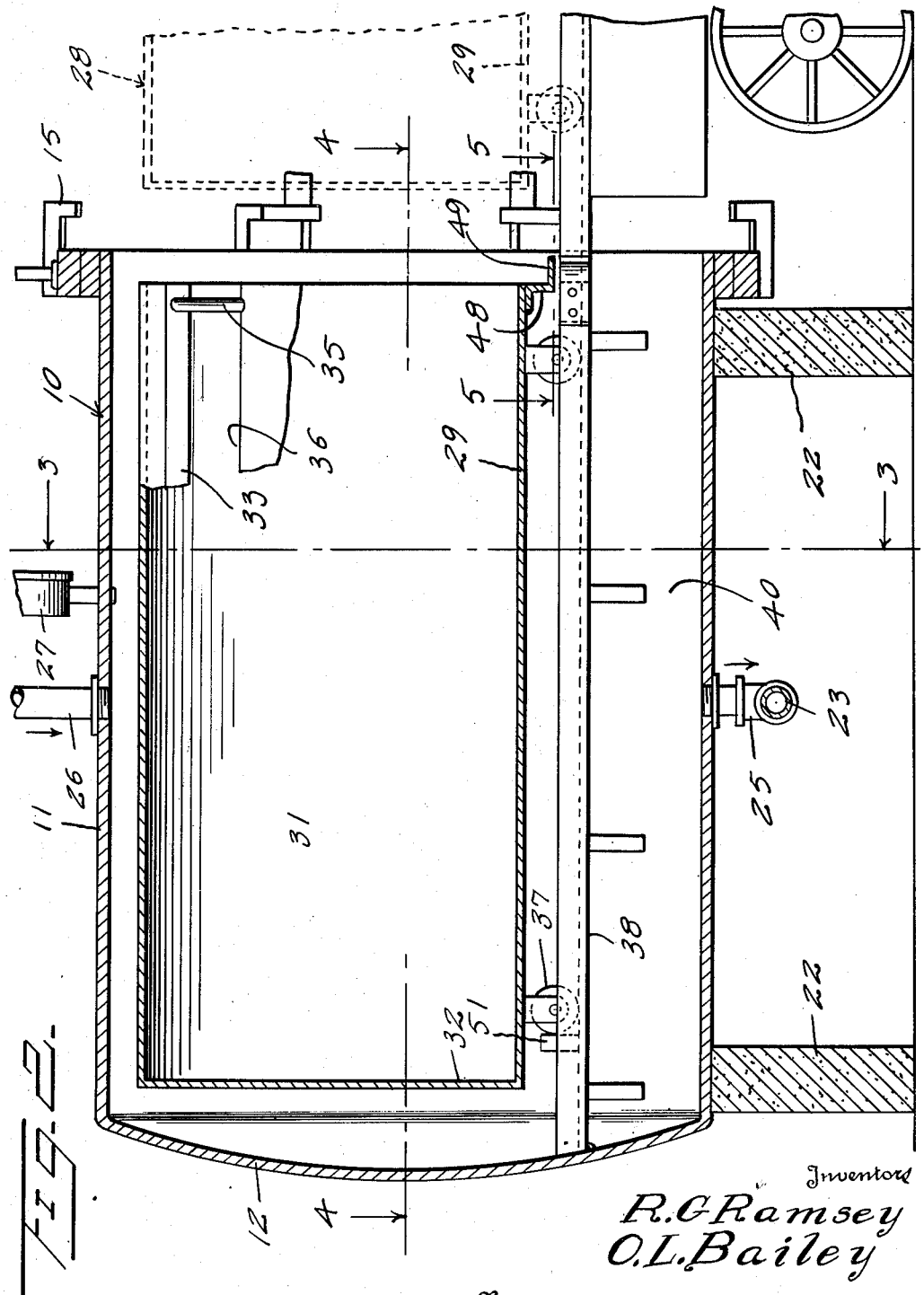

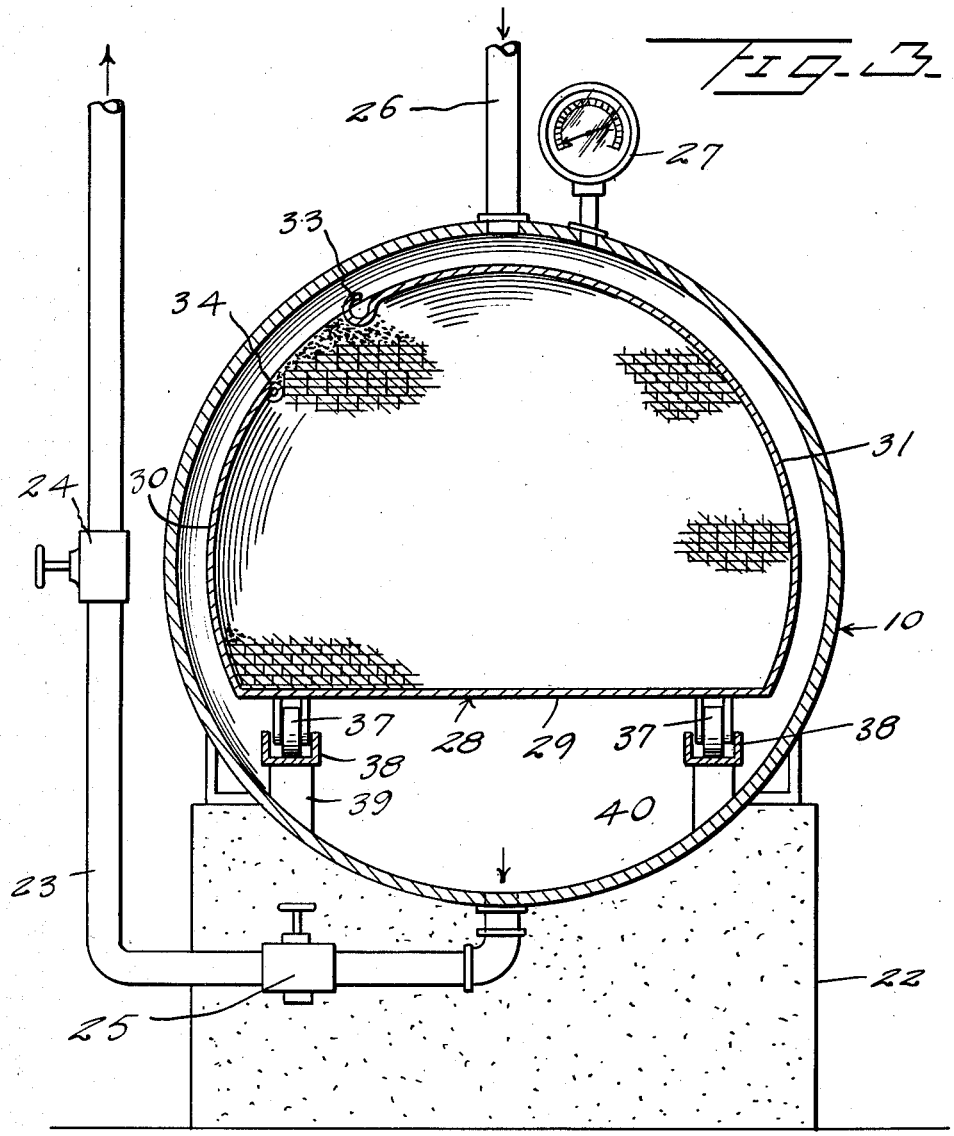

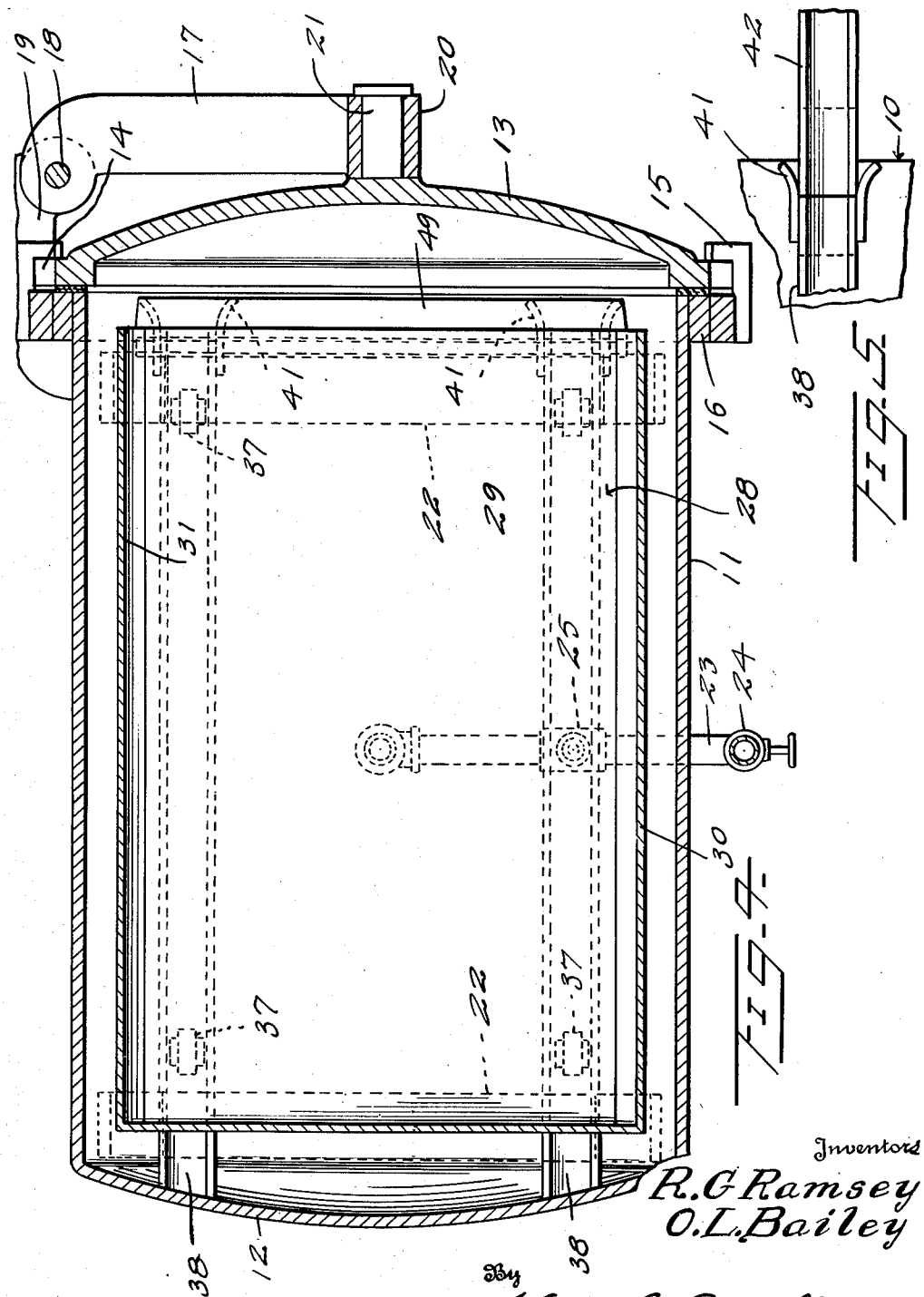

Patented Apr. 25, 1950

2,505,302

UNITED STATES PATENT OFFICE 2,505,302

APPARATUS FOR WOOD TREATMENT

Raymond G. Ramsey, Driver, Va., and Ogden L. Bailey, Vineland, N. J., assignors to American Package Corporation, Portsmouth, Va.

Application October 26, 1945, Serial No. 624,832

3 Claims. (Cl. 21—65)

This invention relates to apparatus for treating wood.

An object of this invention is to provide an improved apparatus for treating wood which includes a pressure tank and a carriage which is movable into the tank, the carriage being formed with a flat bottom wall and upwardly curved side walls. The side walls of the carriage include one wall which is wider than the other and has the free edge thereof spaced from the adjacent upper edge of the other side wall, and which is formed with an upwardly opening trough for collecting condensate.

To the foregoing object, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a detail side elevation of wood treating apparatus constructed according to an embodiment of this invention, Figure 2 is a longitudinal section of the pressure tank with the gauge mounted therein, Figure 3 is a sectional view taken substantially on the line 3—3 of Figure 2, Figure 4 is a sectional view taken substantially on the line 4—4 of Figure 2, Figure 5 is a fragmentary plan view of the telescoping track sections taken substantially on the line 5—5 of Figure 2, and Figure 6 is a fragmentary vertical section of the front portion of the carriage.

Referring to the drawings, the numeral 10 designates generally a pressure tank formed with a horizontally disposed cylindrical side wall 11, a closed rear end wall 12 and a removable front wall 13. The front wall 13 includes a plurality of circumferentially spaced apart locking lugs 14, which are adapted to be engaged with L-shaped keepers 15 carried by an annular flange 16 which is secured to the front end portion of the side wall 11. The front wall 13 is swingably supported by a pivoted arm structure 17 which is pivotally mounted on a pivot 18 carried by ears 19 extending forwardly from the annulus 16.

The inner end portion of the arm structure 17 includes a bushing which loosely engages about a stud 21 carried by the center of the front wall or cap 13. The pressure tank 10 is supported from a pair of base members 22 which are disposed in spaced apart relation. The pressure tank 10 includes a steam intake pipe 26 and a valve 24 arranged for drawing condensate with valve 25 interposed between the valve 24 and the tank 10 so that condensate may be readily drained from the tank or to prevent damage by freezing. The tank 10 has a steam inlet pipe 26 extending from the top thereof and a pressure gauge 27 is mounted adjacent the inlet pipe 26 in the top portion of the tank 10.

A carriage, generally designated as 28, is adapted to be removably mounted in the tank 10. The carriage 28 includes a flat bottom wall 29 and upwardly and inwardly curved side walls 30 and 31. A rear end wall 32 closes the rear end of the carriage 28 whereas the forward end of the carriage 28 is open. The side wall 30 is substantially shorter than the side wall 31, the latter wall extending over the vertical center of the carriage and terminating at its free edge in an upwardly opening trough 33. The upper free edge 34 of the side wall 30 is rolled and is spaced from the trough 33. A connecting bar 35 is welded or otherwise fixedly secured to the forward end portions of the walls 30 and 31, so as to prevent spreading or separating of these walls. The space between the upper edge 34 of the side wall 30 and the downwardly extending free edge of the side wall 31 forms a space 36, which permits the positioning of urea crystals on the upper layers of the wood. The carriage 28 includes at least two pairs of wheels 37, which are adapted to engage U-shaped track members 38 fixedly secured by brackets or supporting members 39 within the pressure tank 10. The flat bottom wall 29 forms a condensate chamber 40 below the carriage 28 within which condensate may collect and from which the condensate may be drained through opening of the drain valve 25 after the steam valve 26 has been moved to closed position.

The customary track members 38 at their forward ends are formed with outwardly flared guide members 41 which are U-shaped in transverse section and secured, as by welding or the like, to the forward ends of the track members 38 and which extend forwardly therefrom, so as to align a pair of U-shaped track members 42 with the track members 38. The track members 42 are secured to a movable carriage, generally designated as 43. The carriage 43 includes a frame 44 having a pair of wheels 45 adjacent one end thereof and also having a caster wheel 46 at the opposite end thereof. A substantially ring shaped member 47 is secured to the forward end of the frame 44 and provides a handle by means of which the carriage 43 may be moved from supply of wood toward the pressure tank 10 and away after treatment to place where material is used and thereby keeping the wood hot by the carriage, which is an essential part of the process. The carriage 43 has secured to the forward end portion of the bottom wall 29 thereof an angle member 48 which is formed with a horizontally disposed forwardly projecting flange 49. The angle member 48 and the flange 49 provide a reinforcing means for the forward end of the bottom wall 29. The carriage 43 has mounted in the tracks or rails 42, stop members 50 which limit the movement of the carriage 28 onto the carriage 43 when the carriage 28 is removed from the pressure tank 10. The rails or tracks 38 also have stop members 51 adjacent the inner ends thereof which are engaged by the innermost pair of wheels 37, so as to limit the inward movement of the carriage 28 into the pressure tank 10.

The wood is placed in the wood treating carriage 28. The wood, if in strips is laid on the flat bottom 29 in layers which may be uneven, so as to provide spaces between the wood or wooden strips for circulation of heat and for the flowing of the solute urea together with the moisture of the wood which flows from the wood in the course of the treatment. After a layer of wood has been placed in the treating carriage 28, urea crystals are distributed thereover, and then additional layers of wood are placed on top of the urea crystals. The procedure is continued until substantially the entire area of the treating carriage is filled with layers of wood and alternate layers of urea crystals with a layer of urea on the top layer of wood. Some of the layers of wood will be exposed as to their lengthwise edges through the space 36.

Additional urea crystals are concentrated near the ends of the wooden strips on each layer through the space 36 and also on top of the uppermost layer of the wood. This has the advantage of giving the ends of the wood a stronger urea treatment where it is generally most desirable as the wood ordinarily is most apt to split near or at the ends. The carriage 43 is moved toward the tank 10 so that the tracks 42 will engage the coupling members or guides 41 in order that the tracks will be held in alignment with the tracks 38. The wood treating carriage which is now filled with wood and which has the urea crystals on the interior thereof is moved inwardly of the pressure tank 10. The end wall 13 is then closed and locked and steam heat is admitted through pipe 26. The steam is preferably dry steam, and under a pressure of from 60 to 150 pounds but less pressure can be used by giving the wood a longer period of treatment. During this time the temperature ranges from 292 degrees Fahrenheit to approximately 370 degrees Fahrenheit. The wood is subjected to the steam pressure for a period of from 40 to 75 minutes depending on the pressure of the steam. The heat will cause the urea crystals to dissolve and as the solution of the crystals is under pressure this solution will be forced into the pores and fibers of the wood so as to impregnate the wood.

Following the pressure treatment of the wood, the treating carriage 28 is removed from the pressure tank. The wood is kept hot in the treating carriage 28 by insulating or covering means of any suitable character to retain the heat in the wood until the wood is bent and used. The process hereinbefore described provides a means whereby the wood will more readily bend without checking or cracking and will more readily retain its bent form after it has cooled to normal room temperature.

A particular advantage of our process of treating wood with urea lies in the fact that we are able to obtain the fullest benefits and strongest concentration of urea in the pores of and throughout the wood without soaking the wood and thus eliminating the disadvantages of discoloration and other troubles incident to soaking the wood.

The exact configuration illustrated is regarded as the optimum, but some of the desirable results inherent in this disclosure may be obtained by various slight modifications including some departure from the exact configuration shown, and it is therefore requested that the scope of the invention should be regarded as limited only by the terms of the claims.

What we claim is:

1. In apparatus for treatment of wood including a tank having a closure at one end thereof, a pair of horizontally disposed tracks in said tank, and an article supporting carriage engageable on said tracks, said carriage comprising a flat bottom, an upwardly and inwardly curved side wall extending along one side edge of said bottom, an upwardly and inwardly curved side wall extending along the other side edge of said bottom, said second side wall extending beyond the longitudinal median line of said bottom, the confronting longitudinal edges of said first and second side walls being spaced apart to define a longitudinally extending slot, and an end wall having the marginal edges thereof joined to the end edges of said side walls and said bottom closing one end of said carriage.

2. Apparatus for treatment of wood according to claim 1, wherein a connecting bar is fixed between said confronting longitudinal edges of said side walls at the ends thereof remote from said end wall.

3. Apparatus according to claim 1, wherein an upwardly opening trough is formed along the longitudinal edge of said second side wall for collecting the condensate forming on the interior of the tank and preventing the entrance of such condensate through said longitudinal slot into said carriage.

RAYMOND G. RAMSEY.
OGDEN L. BAILEY.

REFERENCES CITED

The following references are of record in the file of this patent:

UNITED STATES PATENTS

| Number | Name | Date |
|---|---|---|
| 148,630 | Stead | Mar. 17, 1874 |
| 317,730 | Collings et al. | May 12, 1885 |
| 620,114 | Ferrell | Feb. 28, 1899 |
| 666,915 | Bachert | Jan. 29, 1901 |
| 697,739 | Geisler | Aug. 6, 1901 |
| 1,063,965 | Fuller | June 10, 1913 |
| 1,248,711 | Teesdale | Dec. 4, 1917 |
| 2,135,463 | Coolidge | Nov. 1, 1938 |
| 2,395,311 | Woodhouse | Feb. 19, 1946 |

FOREIGN PATENTS

| Number | Country | Date |
|---|---|---|
| 17,749 | Great Britain | Aug. 7, 1906 |

OTHER REFERENCES

Berliner: "Urea treatment of lumber," Mechanical Engineering, March 1942, pages 181–186.

Kobbe: "Indurating wood with sulphur," Chemical and Metallurgical Engineering, vol. 33, No. 6, June 1926, pages 354–356.